Dec. 16, 1947. K. H. LENK 2,432,626
SAW FRAME
Filed March 4, 1944
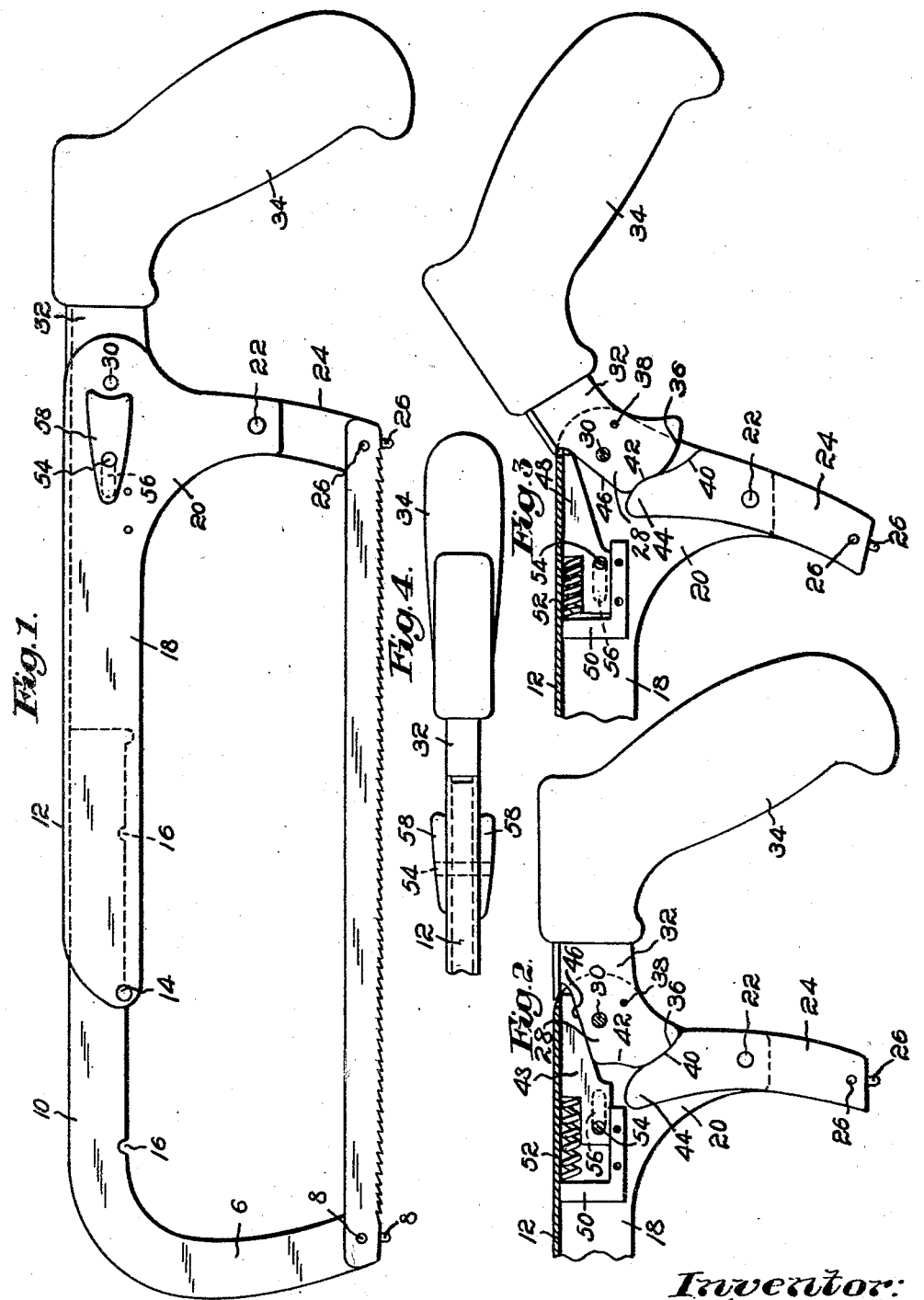
Inventor:
Kurt H. Lenk.
By Emery, Booth, Townsend, Miller & Widner,
Attys

UNITED STATES PATENT OFFICE 2,432,626

SAW FRAME

Kurt H. Lenk, Worcester, Mass., assignor to Parker Manufacturing Company, Worcester, Mass., a corporation of Massachusetts Application March 4, 1944, Serial No. 525,045

5 Claims. (Cl. 145—34)

This invention relates to saw frames and the object is to provide a frame of simple and rugged construction which permits the blade to be quickly inserted in the frame and brought to the proper state of tension and as quickly released therefrom. The frame may be similar to those commonly used with hack saws and thus generally of U-shape with a manipulating handle at one end, and for purposes of illustration there is shown in the accompanying drawings and will hereinafter be described by way of example a construction of such frame suitable for a hack saw. In the drawings:

Fig. 1 is a side elevation of the frame with the blade in place;

Fig. 2 is a view of the handle end of the frame with parts broken away;

Fig. 3 is a view similar to Fig. 2 showing the parts in another position of adjustment to permit the blade to be removed from the frame or inserted therein; and Fig. 4 is a fragmentary top plan view.

Referring now to the drawings and more particularly to Figs. 1 and 2, the frame there shown resembles the conventional hack saw frame of U-shaped form and it may be of adjustable length to accommodate blades of different lengths, and the portion at the left of the figure is herein shown as comprising an angular member of flat metal of sufficient width to provide the desired rigidity having a depending arm 6 with studs 8 carried thereby and extending at right angles one to another, to which the forward end of the blade may be secured either to lie in the plane of the frame or at right angles thereto. This angular member comprises also the horizontal portion 10 forming the forward portion of the back of the frame which telescopes into a channel member 12 forming the cooperating portion of the back and wherein it is secured in the desired position of adjustment by any suitable or usual means, as, for example, the cross-pin 14 shown adapted to engage the notches 16 in the arm 10.

The flanges 18 of the channel 12 toward the right of the frame are extended downwardly to provide cheek portions 20 between the lower parts of which is pivoted on cross-pin 22 an arm 24 having at its lower end the studs 26 to engage the end of the blade. When this arm is held in the position of Fig. 2, it holds the blade under the desired tension. If released so that it is free to swing clockwise to the position of Fig. 3, the blade may easily be removed from the studs 8 and 26 or a blade placed in position on such studs.

To control the position of the arm 24 the upper end thereof above the pivot 22 is formed as a follower adapted to cooperate with a member 28 in the nature of an edge cam received between the cheeks 20 and turning on the cross-pivot 30. This member also embodies an arm 32 extending to the exterior of the frame to provide an operating handle for the cam which herein is also the manipulating handle by which the saw is operated in use and is shown as of the pistol grip type with the grip 34 for encirclement by the grasping hand. The member 28 comprises a convex edge portion 36, preferably a circular arc, which, however, is centered at a point 38 (see Fig. 2) different from the pivot point 30, the relation to the pivot being such that the highest point of the eccentric or cam edge thus formed is at the lower right-hand side in Fig. 1, the edge receding inwardly therefrom toward the pivot 30, and this edge 36 is adapted to fit, in the position of the parts shown in Fig. 2, a similar concave circular edge portion 40 of the upper end of the arm 24 to retain the arm in the position shown, as will hereinafter be more fully described. Above the eccentric camming edge 36 the member 28 may be recessed or cut away at 42 to provide a clearance into which the upper nose portion 44 of the arm 24 may enter so that when the edge 36 moves counterclockwise from the position of Fig. 2 and away from the arc 40, arm 24 is permitted to swing freely in a clockwise direction to the position of Fig. 3. The bottom of this depression provides an abutment for the part 44, as is herein illustrated, to check the movement of the parts in the Fig. 3 position and thus limit movement of the arm to a restricted useful range. Beyond the depression 42 the member has an extended flat edge portion 46 which, with the parts positioned as shown in Fig. 2, extends diagonally downwardly and forwardly in opposition to the web of the channel 12 and is adapted to cooperate with the detent next to be described.

To lock the parts in the position of Fig. 2 a suitable detent 48 for the member 28 is provided which herein is housed between the flanges 18 of the channel and guided between the web thereof and the L-shaped supporting member 59 secured between the flanges. The detent is adapted to slide along the edge of the channel and is projected toward the right in the figure by a spring 52. The end of the detent is tapered along one side to provide a wedge corresponding to the wedge-shaped space between the flat 46 and the web of the channel and, entering the same as shown in Fig. 2, it locks the member 28 from turning movement. For this purpose it is desirable that the end of the detent should extend past the pivot 30, that is, past the perpendicular (herein vertical) from the pivotal center to the path of the detent, the detent thus engaging the flat on either side of the pivot. The detent 48 carries a cross-pin 54 which projects through slots 56 in the flanges of the channel 12 and carries on its outer ends buttons 58 providing for the manual retraction of the detent toward the left in Fig. 2. These buttons 58 are preferably arranged as shown at a location which may be reached for operation when desired by the fingers of the hand which grasps the handle 34 without the necessity of the hand releasing its grip.

Assuming now that the parts are in the position of Fig. 1 and that it is desired to release the blade, the handle 34 is preferably first pressed down slightly to free the parts and the buttons 58 then pressed toward the left in the figures to retract the detent 48. Assuming that the saw is held in the right hand, these buttons may be manipulated by the fingers of the left hand, if desired, but a little experience permits the operator to press them with an extended finger of the hand which grasps the handle 34. The handle 34 is then swung upwardly, viewing the figures, until the circular edge 36 passes the edge 40, releasing the arm 24 to the tension of the blade and permitting it to swing or be swung freely to the position of Fig. 3, the portion 44 then entering the depression 42. The blade may then be easily removed from the studs 8 and 26 and its orientation altered or a new blade substituted.

After the blade has thus been positioned on the arms, the handle 34 is swung downwardly and the eccentric surface 36 then acts on the upper end of arm 24 in the manner of a cam, swinging the arm to the position of Fig. 2, placing an adequate tension on the blade and holding the arm securely by virtue of the extended contact of the two circular arcs 36 and 40 when the parts have moved to the position of Fig. 2. The detent 48 snaps in over the flat into the space between the same and the web of the channel and securely retains the parts in that position.

It may be noted that if the parts are not brought fully to the final position, any looseness or play as the saw is used tends to set up a vibration which is automatically taken up on one phase by the action of the wedge 48 which creeps toward the right under the stress of the spring as any opportunity for it to move in that direction is afforded until the final position of Fig. 2 is reached. Moreover, particularly because of the fact that the wedge extends past the center 30 to rest on the flat 46 at both sides thereof, there is no danger that it will be pushed back by any vibration or strain which may occur in use.

The ornamental design exhibited by the completed frame as shown in Fig. 1 of the drawings was originated jointly by the present applicant and Dwight E. Priest of Worcester, Massachusetts.

It will be apparent that the invention may be embodied in other specific forms without departing from the spirit or essential attributes thereof, and the present embodiment should therefore be considered in all respects as illustrative and not restrictive, as is in fact clear in several matters from the description itself. Reference is to be had to the appended claims to indicate those principles of the invention exemplified by the particular embodiment described and which it is desired to secure by Letters Patent.

I claim:

1. In a saw frame comprising a channel-shaped member with its web presented to provide at least a portion of the back of the frame, an arm pivoted at a point between its ends between the flanges of the channel and having at its outwardly projecting end means for engaging the end of a blade, a cam-like member journalled between the flanges and abutting the inwardly extending end of the arm to effect the swinging movement thereof in one direction and having an exterior operating handle, the member being at least in part spaced from the web of the channel when it has completed such swinging movement of the arm, and a wedge-like retractible detent normally projected into the space between said member and the web of the channel to engage the member and web and thereby to lock the arm in blade-tensioning position.

2. A saw frame having a swinging arm provided at one end with means for engaging a blade and having a circular locking edge adjacent its other end, a rotatable member having a circular edge movable into abutting relation with the said edge of the arm, the center of the latter edge being remote from the axis of rotation of the member, said member also having a flat, an exteriorly disposed handle for turning said member and a retractible wedge detent movable in the plane of said member and having a diagonal edge projected into edge to edge engagement with the flat to lock the rotatable member with the circular edges engaged to hold the arm in cammed out blade-tensioning position.

3. A saw frame having a swinging arm provided at one end with means for engaging a blade and having a circular locking edge adjacent its other end, a rotatable member having a circular edge movable into abutting relation with the said edge of the arm, the center of the latter edge being remote from the axis of rotation of the member, said member also having a flat, an exteriorly disposed handle for turning said member and a retractible wedge detent movable in the plane of said member and having a diagonal edge projected into edge to edge engagement with the flat to lock the rotatable member with the circular edges engaged to hold the arm in cammed out blade-tensioning position, the wedge and the flat engaged thereby in the locking position of the parts extending past the perpendicular from the pivotal center of said member to the path of movement of the detent.

4. In a saw frame comprising a channel-shaped member with its web presented to provide at least a portion of the back of the frame, an arm pivoted at a point between its ends between the flanges of the channel and having at its outwardly projecting end means for engaging the end of a blade, a manipulating handle for the saw having a tang journalled between the flanges which tang has an eccentrically located cam rise which abuts the inwardly extending end of the arm to effect the swinging movement thereof in a direction to tension the blade, the tang when in blade-tensioning position being in part spaced from the web of the channel, and a wedge-like retractible detent normally projected into the space between said tang and the web of the channel to engage the member and web and thereby to lock the arm in blade-tensioning position.

5. In a saw frame comprising a channel-shaped member with its web presented to provide at least a portion of the back of the frame, an arm pivoted at a point between its ends between the flanges of the channel and having at its outwardly projecting end means for engaging the end of a blade, and a manipulating handle for the saw having a tang entering between the flanges of the channel and journalled thereto, the portion of the tang which enters between the flanges being an edge cam which abuts the inwardly extending end of the arm to effect the swinging movement thereof in a direction to tension the blade when the handle is in operating position and releasable means for locking the handle in that position.

KURT H. LENK.

REFERENCES CITED

The following references are of record in the file of this patent:

UNITED STATES PATENTS

| Number | Name | Date |
|---|---|---|
| 1,078,599 | Garman | Nov. 11, 1913 |
| 1,113,591 | Wood | Oct. 13, 1914 |
| 1,115,858 | Nielsen | Nov. 3, 1914 |
| 2,034,625 | Lorusso | Mar. 17, 1936 |
| 1,406,422 | Siddon | Feb. 14, 1922 |
| 1,663,076 | Garner | Mar. 20, 1928 |
| 2,116,137 | Biester | May 3, 1938 |

FOREIGN PATENTS

| Number | Country | Date |
|---|---|---|
| 187,525 | Great Britain | Oct. 26, 1922 |
| 554,750 | France | Mar. 8, 1923 |